United States Patent
Huhnd et al.

(10) Patent No.: US 8,813,581 B2
(45) Date of Patent: Aug. 26, 2014

(54) FORCE MEASURING SYSTEM, METHOD FOR MEASURING FORCES AND TORQUES ON A ROTATING BODY AND WIND TUNNEL WITH A MODEL ARRANGED THEREIN AND COMPRISING AT LEAST ONE PROPELLER WITH A FORCE MEASURING SYSTEM

(75) Inventors: Michael Huhnd, Thedinghausen (DE); Erik Goldhahn, Bremen (DE); Stephan Zipp, Bremen (DE); Alberto Villa, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 284 days.

(21) Appl. No.: 13/407,068

(22) Filed: Feb. 28, 2012

(65) Prior Publication Data

US 2012/0216631 A1 Aug. 30, 2012

Related U.S. Application Data

(60) Provisional application No. 61/447,376, filed on Feb. 28, 2011.

(30) Foreign Application Priority Data

Feb. 28, 2011 (DE) .......................... 10 2011 012 601

(51) Int. Cl.
*G01L 1/12* (2006.01)
*G01M 9/06* (2006.01)

(52) U.S. Cl.
CPC ..................................... *G01M 9/062* (2013.01)
USPC ........................................ 73/862.69; 73/147

(58) Field of Classification Search
USPC ............................................... 73/147, 862.69
See application file for complete search history.

(56) References Cited

U.S. PATENT DOCUMENTS

| | | | |
|---|---|---|---|
| 1,980,195 A | 11/1934 | Gerhardt et al. | |
| 3,604,255 A * | 9/1971 | Bart | 73/862.28 |
| 4,573,358 A | 3/1986 | Luongo | |
| 5,110,314 A * | 5/1992 | Fujihara et al. | 446/34 |

(Continued)

FOREIGN PATENT DOCUMENTS

| | | |
|---|---|---|
| EP | 2075561 A2 | 7/2009 |
| GB | 2448940 A | 11/2008 |

OTHER PUBLICATIONS

German Office Action, dated Sep. 28, 2011, for German Patent Application No. 10 2011 012 601.5.

(Continued)

*Primary Examiner* — Freddie Kirkland, III
(74) *Attorney, Agent, or Firm* — Ingrassia Fisher & Lorenz, P.C.

(57) ABSTRACT

A force measuring system is provided for measuring forces on a rotating body that includes, but is not limited to a force measuring device, which is mounted on the rotating body, as well as a position sensing unit for detecting the rotation of the rotating body and an evaluation unit, which is connected to the force measuring device and the position sensing unit. The evaluation unit is configured for recording a force value measured by the force measuring device depending on the detected position of the rotating body. The force measuring system allows the forces and torques on a rotating body to be determined precisely and as flexibly as possible, independently of the prevailing rotation speed of the rotating body.

18 Claims, 4 Drawing Sheets

(56) References Cited

U.S. PATENT DOCUMENTS

| | | | |
|---|---|---|---|
| 5,150,859 A * | 9/1992 | Ransick | 244/58 |
| 5,259,729 A * | 11/1993 | Fujihira et al. | 416/25 |
| 5,393,201 A * | 2/1995 | Okutani et al. | 417/16 |
| 5,850,990 A * | 12/1998 | Gevers | 244/105 |
| 7,081,828 B2 * | 7/2006 | Low | 340/815.45 |
| 7,617,741 B1 * | 11/2009 | Lowe-Wylde | 73/862.29 |
| 7,883,319 B2 | 2/2011 | Volkmer | |
| 8,040,130 B2 * | 10/2011 | Chiapuzzi | 324/207.25 |
| 8,177,505 B2 * | 5/2012 | Scholte-Wassink | 416/1 |
| 8,322,984 B2 * | 12/2012 | Bosselmann | 416/42 |
| 2007/0216403 A1 * | 9/2007 | Asano | 324/207.25 |
| 2009/0169357 A1 | 7/2009 | Slack | |
| 2010/0004878 A1 | 1/2010 | Volanthen et al. | |
| 2011/0208400 A1 * | 8/2011 | Lickfold et al. | 701/100 |

OTHER PUBLICATIONS

Rae, W.H., et al., Low Speed Wind Tunnel Testing, A Wiley-Interscience Publication, 1984, 330-343, Second Edition, John Wiley & Sons, New York.

* cited by examiner

FORCE MEASURING SYSTEM, METHOD FOR MEASURING FORCES AND TORQUES ON A ROTATING BODY AND WIND TUNNEL WITH A MODEL ARRANGED THEREIN AND COMPRISING AT LEAST ONE PROPELLER WITH A FORCE MEASURING SYSTEM

CROSS-REFERENCE TO RELATED APPLICATIONS

This application claims priority to German Patent Application No. 10 2011 012 601.5 filed Feb. 28, 2011 and to U.S. Provisional Patent Application No. 61/447,376 filed Feb. 28, 2011, which are incorporated herein by reference.

TECHNICAL FIELD

The technical field relates to a force measuring system for measuring forces and torques on a rotating body, a method for measuring forces of a rotating body, and a wind tunnel with a model arranged therein and comprising at least one propeller, wherein the model has a force measuring system.

BACKGROUND

In order to measure forces and torques on a rotating body force measuring devices are usually used which are mounted on the rotating body. To determine the directions of force for each relevant direction of force an appropriate solution is to use at least one accordingly oriented force measuring device, the individual force measuring devices preferably being arranged at a 90° angle to each other. To determine the direction and size of the forces, the force values measured by the individual force measuring devices can be grouped component by component into a force vector.

In order to be able to measure the forces of a propeller of a wind tunnel model, a rotating force measuring device in the form of a propeller force balance (also known as "rotating shaft balance", RSB) is normally used. This is mechanically attached to the hub of the propeller. Measured forces are transmitted telemetrically via a pairing having a rotating and a fixed coil or, alternatively, via one or more slip rings of a fixed device, for example an evaluation unit or a measured value recorder.

A method for measuring propeller forces of wind tunnel models is known where the occurring propeller forces are measured in all relevant spatial directions once only for each rotation of the propeller in order to calculate the resulting force vector. According to the Nyquist-Shannon theorem, however, the signal components that have frequencies higher than one-half of the rotational frequency of the propeller are not detected. Also, interferences with higher frequencies are not detected and cannot be separated from the actual signal. Since, when rotating force sensors rotate in relation to a spatially fixed force, only position-dependent force components are detected which, for instance, display a sinusoidal progression over one rotation, a precise measurement of the actually occurring force requires a sufficient sampling rate.

Another method is known where the occurring forces are measured with a constant, sufficiently high sampling rate for each rotation. They are then grouped together in force vectors through the numerical determination of their position based on the rotational progress above the adjusted speed. The disadvantage of this method, however, is the direct dependence of the determined force direction and force value on the rotation speed, which means that, for the position to be determined correctly, a constant rotation speed must be assumed.

In view of the foregoing, at least one object is to provide a system and method for measuring forces and torques occurring on a rotating body which does not have the disadvantages mentioned above. In particular, at least one object is to provide such a system and method allowing the forces and torques on a rotating body to be determined precisely and as flexibly as possible and therefore independently of the prevailing rotation speed of the rotating body. In addition, other objects, desirable features, and characteristics will become apparent from the subsequent summary and detailed description, and the appended claims, taken in conjunction with the accompanying drawings and this background.

SUMMARY

It should be pointed out that, in the summary and detailed description, for the purpose of explanation reference is also made to an embodiment based on a method for determining forces on a propeller on a wind tunnel model, e.g., of an aircraft. Some axes are named or indicated by means of an index inferred from the standard EN 9300 (also ISO 1151). These relate to the standard body coordinate system of an aircraft, in which the X axis represents the longitudinal axis of the aircraft, the Y axis represents the transverse axis, and the Z axis represents the vertical axis. Accordingly, the rotational plane of a propeller of a wind tunnel model is spanned by the y-z axes, so that forces acting there can be labelled $F_Y$ and $F_Z$ and the torques around both these axes can be indicated by means of $M_Y$ and $M_Z$. All forces running in an X direction therefore do not lie on the rotational plane but perpendicular to it, with $F_X$ being the thrust of the propeller and $M_X$, for example, a necessary torque for the rotation of the propeller.

The force measuring system according to an embodiment comprises at least one rotating force measuring device, a position sensing unit and an evaluation unit. The evaluation unit is connected both to the position sensing unit and to the force measuring device. The rotating force measuring device is designed to measure a force in a specific direction of force that is independent of the design and assembly situation of the force measuring device. To this end, force sensors are to be used.

A force sensor may preferably be designed as a strain gauge (SG), which can be used to measure a strain, from which, with knowledge of the relevant material subject to the strain, the applicable force can be measured. The force measuring device preferably comprises several force sensors, preferably at least one force sensor for each force direction or spatial direction.

The position sensing unit is designed to detect the position of the force measuring device. In the case of rotating force measuring devices, the position may be an angle position, which specifies an angle to a reference position.

The evaluation unit is adapted for allocating a measured force value in space depending on the position detected in each case in order to measure precisely the force occurring for each rotation of the rotating body. The evaluation unit can trigger the measurement of force values in that the force measuring device is read for predetermined intermediate positions of the rotating body and the values it provides are recorded for further use.

Through the direct coupling of a position sensing unit with an evaluation unit, which enables a force to be measured for several positions, for any position of the rotating body a data point can be determined which is composed of the current position and the force measured in this position.

Through repeated measuring at different positions a field of forces can be formed on the entire rotation plane and in a vertical direction, which makes it much easier for the evaluation unit to evaluate the forces arising, especially on the rotation plane, depending on the number of data points used.

On the basis of the general structure described, it is clear to the skilled person that all forces and torques can be measured in all spatial directions. This relates, therefore, not only to forces on the rotation plane but also to forces that run vertically to the rotation plane. With the aid of figures, the description below focuses on the determination of forces and torques on the rotation plane, as these forces are directly dependent on the rotation of the rotating body. However, this should not be interpreted as meaning that all forces and torques that are perpendicular to the rotation plane are excluded, or that the invention is restricted to all forces within the rotation plane.

A position sensing unit suitable for detecting a rotation can be achieved in a variety of ways. Basically, a rotation is detected between a fixed component and a rotating component. One of the components may, for example, have a hole disc or a serrated ring, in which case a position sensing unit may then comprise a metal sensor. In such an embodiment, pulse signals are generated at the output of the metal sensor of the position sensing unit, if the hole disc or the serrated ring moves past the metal sensor, and the progress of the rotation can be determined by counting the pulse signals, and the rotation speed can be determined by determining the pulse rate.

Another possibility is to insert magnetic elements, spaced apart from one another, on the circumference of a circumference centred around a central axis, which move past a magnetic field sensor when the rotating body rotates. In such an embodiment also, pulse signals are generated at the output of the magnetic field sensor, which can be used to determine the speed of rotation, by measuring the pulse frequency, or to determine the position by counting the pulses.

In another embodiment, a hole disc or a serrated ring is inserted, the position sensing unit being a photoelectric sensor and, in particular, a photoelectric device designed to produce pulse signals when the rotating body rotates, which, according to the preceding description, can be used to determine the position or the speed of rotation.

In an embodiment, the position sensing unit may have a first position mark and a first position mark detection unit. The first position mark may be an optical mark, a translucent opening, a magnetic element or a recess, which can be measured periodically in the event of a relative movement by means of an optical or magnetic position mark detection unit and serves to mark a complete rotation of the rotating body.

At the same time, an embodiment comprises two or more second position marks, which can be designed like the first position mark and mark intermediate steps or positions, i.e., increments, of a rotation of the rotating body. Second position mark detection units are used which can detect these intermediate positions and can be designed in the same way as the first position mark detection units.

The evaluation unit is also adapted for creating, when a first position mark is detected, a new data field for captured forces which may be filled with captured force values during a complete rotation. In this way, a large number of data fields may be provided, for example in the form of a matrix, in which the captured forces are stored over an entire rotation of the rotating body. In this way, during an evaluation temporally discrete sections of a measurement sequence can be easily accessed and a temporal angle and force progression can be established.

In an embodiment, the rotating body comprises a plurality of second position marks which are distributed over a circle arranged concentrically in relation to an axis of rotation of the rotating body. Such a constellation can be described as indexing, which is arranged equidistantly on the circumference of the rotating body. Through a detection unit this sequence of second position marks can produce a pulse or signal to indicate that a rotation increment has been completed. These signals can be correlated with the captured force values over time so that the exact position of the rotating body can be indicated.

In an embodiment, the evaluation unit, controlled by the second position marks, is adapted for triggering the measurement of the forces by the force measuring unit. Accordingly, this represents the reverse of the process described above, as the aim is to measure the forces for predefined positions instead of determining the positions for the measured forces. In this way, in an embodiment of the indexation which is advantageous for the particular application, the measurement of forces on the rotation plane can take place in pre-established steps.

In another embodiment, the rotating body or a body connected to it and rotating along with it comprises at least three second position marks. According to the Nyquist-Shannon sampling theorem, it is customary for a continuous, band-limited signal to be sampled which has a frequency that is more than twice the maximum frequency. This means, conversely, that more than two samplings should be carried out for each rotation. A higher sampling rate than twice the frequency of rotation should therefore be used so as to be able to precisely detect interferences with higher frequencies. Accordingly, it is recommended that three or more samplings are carried out for each rotation so that a total of three sampling steps can be initiated by three second position marks.

In an embodiment, the rotating body or a body connected to it and rotating along with it comprises at least 12 second position marks. Interferences with higher frequency are noticeable in the frequency spectrum up to the fourth order. In order to measure them, at least 12 sampling steps per rotation should be carried out during sampling.

In an embodiment, the evaluation unit is adapted for carrying out an evaluation based on a Fourier analysis in order to filter out signals that have higher frequencies than the frequency of rotation. With the following principal equations, forces $F_y$, $F_z$ as well as torques $M_y$, $M_z$ would be measured at the frequency of rotation in the plane of rotation of the rotating body if only one force measuring unit rotated:

$$F_y = \frac{2}{N}\sum_{i=1}^{N}[F_{y,i} \cdot (-\sin(\phi))]; M_y = \frac{2}{N}\sum_{i=1}^{N}[M_{y,i} \cdot \cos(\varphi)]$$

$$F_z = \frac{2}{N}\sum_{i=1}^{N}[F_{z,i} \cdot \cos(\varphi)]; M_z = \frac{2}{N}\sum_{i=1}^{N}[M_{z,i} \cdot \sin(\varphi)]$$

where:
$F_y$, $F_z$, $M_y$, $M_z$: calculated forces, filtered according to frequency of rotation, in the stationary coordinate system,
N: number of trigger positions for a rotation, especially the number of first and second position marks,
$F_{y,i}$, $F_{z,i}$, $M_{y,i}$, $M_{z,i}$: signal amplitude of the force sensor in position i, and
$\phi$: current angle of rotation in position i in the stationary coordinate system.

The force measuring system is, for example, particularly suitable for measuring the forces of propellers on a wind tunnel model. Using the force measuring system for this task the variability in the rotational speed of the propellers can be provided in the wind tunnel during a measurement, while, at the same time, the forces and torques on the propeller can be measured very precisely independently of the speed of rotation.

The rotating body is designed as a propeller, which is mounted on a stationary motor by means of a hub. The position sensing unit may be mounted between the motor and the propeller, so that, for example, the propeller comprises position marks or other indexing or marking elements on a surface facing the motor. As, when measuring devices are mounted in wind tunnel models, care should be taken to ensure that neither the flow nor the characteristic motion properties of bodies are affected, the position sensing unit may also be mounted on a drive shaft between a drive unit and the propeller or on a shaft tailpiece behind the motor. A covering usually arranged over the drive unit means that the flow is unaffected. As, furthermore, the position sensing unit can be mounted at a distance from the propeller, it can be expected that the properties of the propeller with regard to rotation-induced vibrations or other motion phenomena are not affected.

A method is also provided for measuring forces of a rotating body. In addition, a wind tunnel is also provided with a model mounted therein and comprising at least one propeller, the propeller being driven, and at least one force measuring device being mounted on at least one propeller drive shaft.

BRIEF DESCRIPTION OF THE DRAWINGS

Further characteristics, advantages and application options can be taken from the following description of the exemplary embodiments in the figures. All the characteristics that are described and/or depicted form, individually and in any combination, the subject-matter of the invention independently of their composition in the individual claims or their references. The figures also contain identical reference signs for identical or similar objects.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
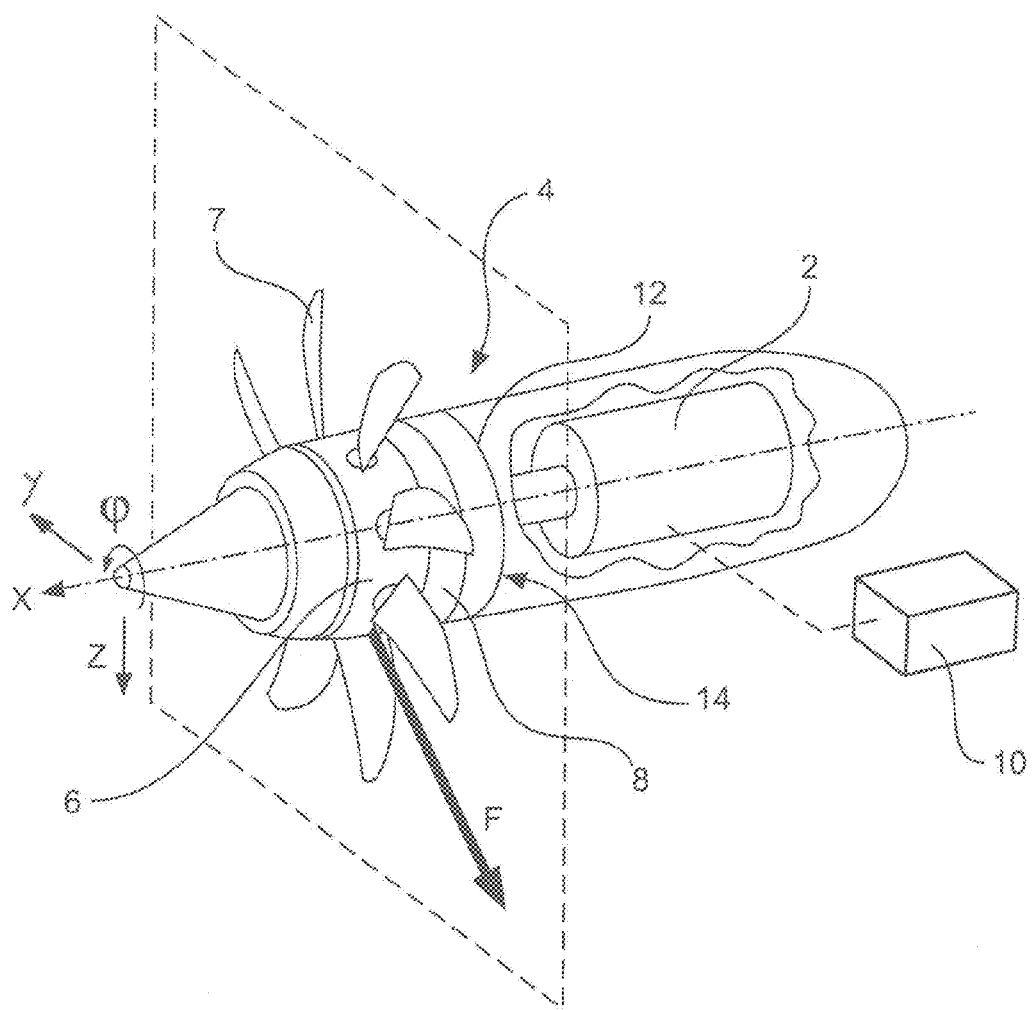
FIG. 1 shows a schematic view of a force measuring system mounted on a motor for a propeller of a wind tunnel aircraft model.

FIG. 1 shows a schematic presentation of an application of the force measuring system. A stationary motor 2 mounted, for example, in a wind tunnel aircraft model drives a propeller 4 as a rotating body, which comprises a propeller hub 6 connected to the motor 2 and propeller blades 7 mounted on the propeller hub 6. In the longitudinal direction (x-axis) in front of the motor 2 a force measuring device 8 in the form of a propeller force device is arranged, which rotates with the propeller 4 and is adapted to measure the forces and torques occurring on the propeller 4.

To transmit the values measured by the force measuring device 8 to an evaluation unit 10, a pair of coils is used, for example, with one coil in the force measuring device and one coil 12 connected to the propeller 4 forming a transducer, wherein the connected coil 12 is attached to the evaluation unit 10 to transmit the data through a wireless or wired connection. This arrangement can also be used to transmit electric power to a force measuring device, if this is necessary due to the design and is indicated especially by maintenance-free and smooth operation.

The evaluation unit 10 is only depicted symbolically and can be mounted both in the hub of the motor 2 and further away in the wind tunnel model or entirely in an adjacent or distant space or, as long as the electrical connection to the force measuring device 8 for the transmission of the electrical signals dependent on the force remains guaranteed.

Figure 3A:
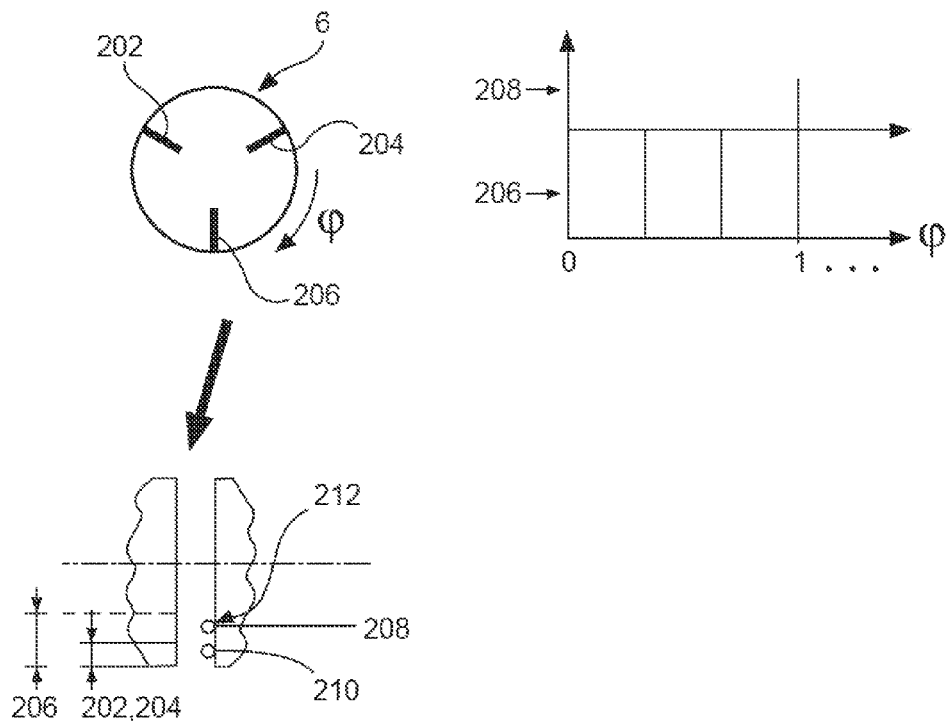
FIG. 3a-3c show various possible position sensing units.
Figure 3B:
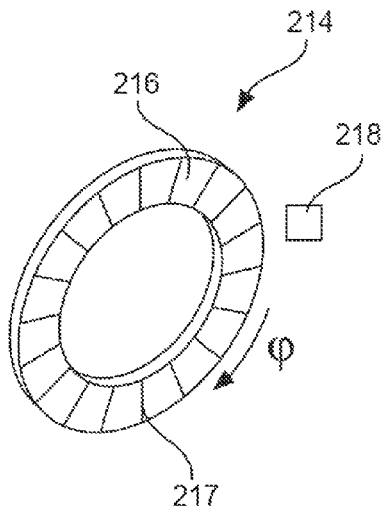

Preferably between the propeller 4 and the coil 12, there is a position sensing unit 14 which is adapted for sensing the rotation in the form of the angle $\phi$ or its time derivation as angular velocity in an incremental way, which is described in more detail in FIG. 3a and FIG. 3b.

The goal of the combination of the force measuring device 8, the position sensing unit 14 and the evaluation unit 10 is to determine a force F, which lies, for example, on the plane of rotation in y-z extension. The force measuring system is designed to be able to detect a dependency between the current angle $\phi$ and the recorded force or torques entirely independently of the relevant speed of rotation. Preferably, the evaluation unit 10 is designed to record and evaluate measurements for pre-defined angle position increments.

Figure 2:
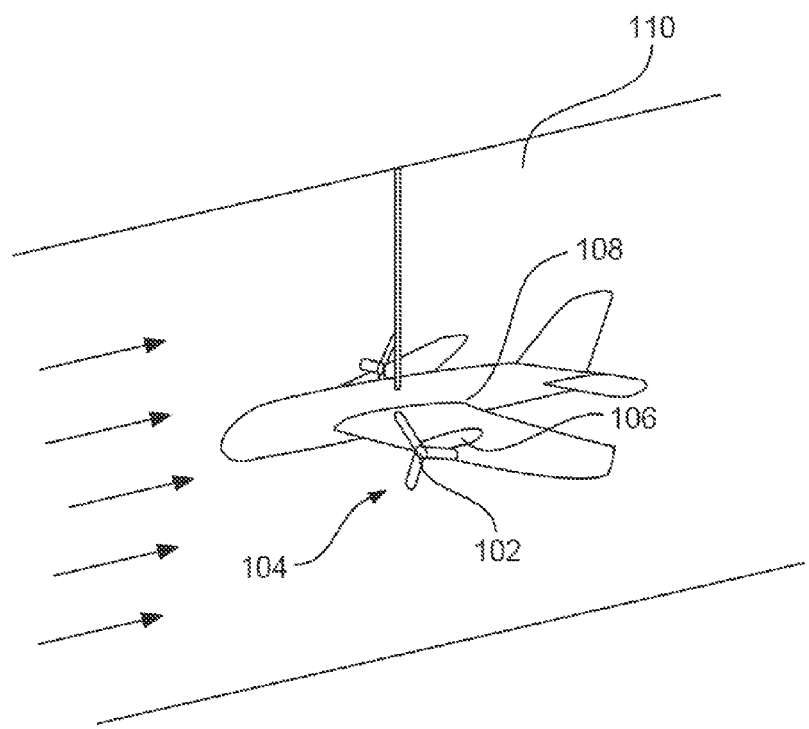
FIG. 2 shows a wind tunnel model of an aircraft with propellers and a force measuring system.

The force measuring system, as shown in FIG. 2, is an appropriate solution for measuring forces on propellers 104 of a wind tunnel model 108. These propellers 104 comprise propeller hubs 102, which are driven by a motor 106. The motor 106 and the propeller 104 are mounted on a wind tunnel model 108, which is in a wind tunnel 110. In this way, effective and very accurate force measurement can be achieved which, according to FIG. 3a through FIG. 3c, using a position sensing unit and a corresponding evaluation algorithm, is very advantageous in comparison to known methods from the state of the art.

FIG. 3a shows a rotating surface facing the coil 12 in a plan view in x direction, which is located, for example, on a shaft between the propeller 4 and the motor 2 or on a shaft tail end behind the motor 2 and the side facing the propeller 4. On this surface, for example, optical position marks 202, 204 and 206 are arranged, which are used to detect the rotation. A position sensing unit 212 may be achieved in this way, for example in the form of combinations of light emitters and receivers or optical image sensors 208 and 210, which are designed to recognise the position marks 202, 204 and 206 when they pass by. The first position mark 206 serves, for example, to detect a complete rotation in order to define a reference point for each rotation. In order to keep optical image sensors and the number of arranged position marks to a minimum, the first position mark 206 may, for example, be designed to be longer than the second position marks 204 and 206, so that the first position mark 206 can be used both as the first and the second position mark. The passing movement of the first position mark 206 can be detected by the optical sensor 208, where the second optical sensor 210 can detect the passing movement of the first position mark 202 and of the first position mark 206.

As explained above, the number of second position marks 202, 204 (and 206) shown in FIG. 3a is chosen as an example. Interferences of higher frequency, which are noticeable in a frequency spectrum up to the fourth order, can be detected using 12 or more second position marks. As shown in FIG. 3a, depending on the angle $\phi$, this can lead to a sequence of signals, each of which represents a movement increment and, for example, also the completion of a complete rotation. FIG.

Figure 3C:
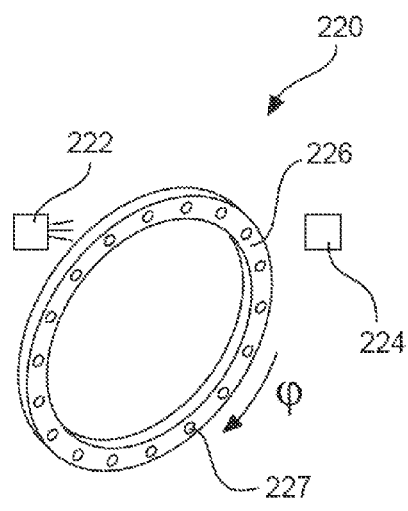

3b and FIG. 3c show additional position sensing units 214 and 220, each of which comprises recesses on the circumference of a rotating body 216 and 226 which are detected either by a magnetic sensor 218 or by a photoelectric sensor arrangement with a light emitter 222 and a light receiver 224 when they pass by.

Figure 4:
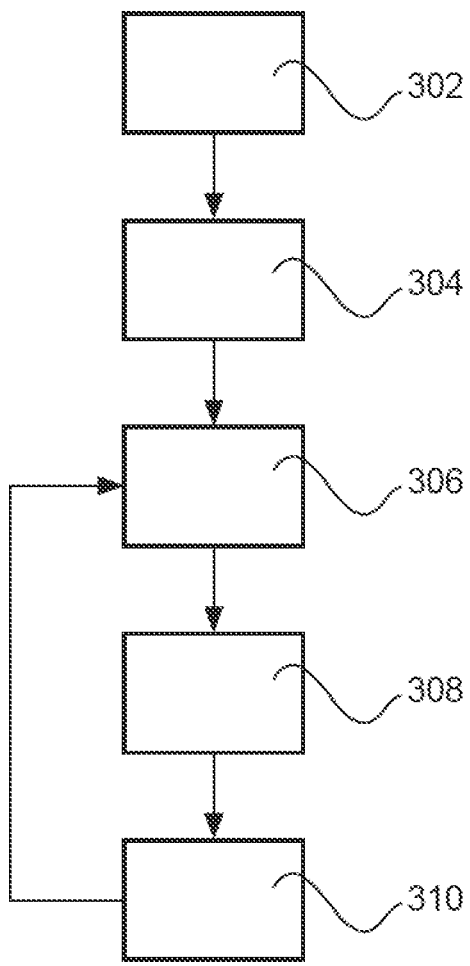
FIG. 4 shows a schematic block-based diagram of a method.

Finally, FIG. 4 shows a block-based representation of a method for measuring the forces of a rotating body. This essentially comprises the steps of rotation 302 of the rotating body, sensing 304 of the position of the rotating body, measuring 306 of a force on the rotating body by means of a force measuring device, and assigning 308 of the detected position to the measured force. The method can also include the step of triggering 310 the measurement of a force when a predefined position has been reached.

It should also be stressed that "comprises" does not exclude other elements or steps and "a" or "an" does not exclude a plurality. It should also be stressed that characteristics which have been described with reference to one of the foregoing embodiments can also be used in combination with other characteristics of other embodiments described above. In addition, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A force measuring system for measuring forces on a rotating body including a hub for connection to a rotating axis, comprising:
   a force measuring device configured to mount on the rotating body, and the force measuring device measures a force value on a plane of rotation in a y-z extension and the y-z extension is perpendicular to the rotational axis of the rotating body;
   a position sensing unit configured to detect a position of the rotating body; and
   an evaluation unit connected to the force measuring device and the position sensing unit,
   wherein the evaluation unit is configured to record the force value measured by the force measuring device depending on the position of the rotating body.

2. The force measuring system according to claim 1, wherein the evaluation unit is configured to trigger the force measuring device to record force values for predefined positions of the rotating body.

3. The force measuring system according to claim 1, wherein the position sensing unit is an incremental rotary encoder.

4. The force measuring system according to claim 3, wherein the incremental rotary encoder comprises optical sensors and optical position marks configured to mount on the rotating body.

5. The force measuring system according to claim 3, wherein the incremental rotary encoder comprises magnetic sensors and magnetic elements in metal elements configured to attach to the rotating body.

6. The force measuring system according to claim 1, wherein the position sensing unit comprises:
   a first position mark configured to mark a complete rotation of the rotating body;
   a first position mark detection unit configured to record the first position mark; and
   a second position mark and a second position mark detection unit configured to record the second position mark.

7. The force measuring system according to claim 6, wherein the position sensing unit comprises three or more second position marks.

8. The force measuring system according to claim 6, wherein the evaluation unit is configured to create, when the first position mark is detected, a new data field for captured forces that is filled with captured force values during the complete rotation of the rotating body.

9. A method for measuring forces of a rotating body, comprising:
   rotating the rotating body about a rotational axis;
   sensing a position of the rotating body;
   measuring a force on a plane of rotation of the rotating body in a y-z extension with a force measuring device, the y-z extension perpendicular to the rotational axis of the rotating body; and
   assigning the position to the force.

10. The method according to claim 9, further comprising:
    triggering the measuring of the force when reaching a predefined position.

11. A wind tunnel including a model and a force measuring system for measuring forces on the model in the wind tunnel, the wind tunnel comprising:
    the model arranged within the wind tunnel;
    at least one propeller; and
    the force measuring system for measuring forces on the at least one propeller including a hub for connection to a rotating axis, comprising:
        a force measuring device configured to mount on the at least one propeller and the force measuring device measures a force value on a plane of rotation in a y-z extension and the y-z extension is perpendicular to the rotational axis of the rotating body;
        a position sensing unit configured to detect a position of the at least one propeller; and
        an evaluation unit connected to the force measuring device and the position sensing unit,
        wherein the evaluation unit is configured to record the force value measured by the force measuring device depending on the position of the at least one propeller.

12. The wind tunnel according to claim 11, wherein the evaluation unit is configured to trigger the force measuring device to record force values for predefined positions of the at least one propeller.

13. The wind tunnel according to claim 11, wherein the position sensing unit is an incremental rotary encoder.

14. The wind tunnel according to claim 13, wherein the incremental rotary encoder comprises optical sensors and optical position marks configured to mount on the at least one propeller.

15. The wind tunnel according to claim 13, wherein the incremental rotary encoder comprises magnetic sensors and magnetic elements in metal elements configured to attach to the at least one propeller.

16. The wind tunnel according to claim 11, wherein the position sensing unit comprises:
    a first position mark configured to mark a complete rotation of the at least one propeller;
    a first position mark detection unit configured to record the first position mark; and a second position mark and a second position mark detection unit configured to record the second position mark.

17. The wind tunnel according to claim 16, wherein the position sensing unit comprises three or more second position marks.

18. The wind tunnel according to claim 17, wherein the evaluation unit is configured to create, when the first position mark is detected, a new data field for captured forces that is filled with captured force values during the complete rotation of the at least one propeller.

* * * * *